July 8, 1969    A. M. GIBBONS    3,453,765
FISHING ROD SUPPORT
Filed Oct. 27, 1966    Sheet 1 of 3
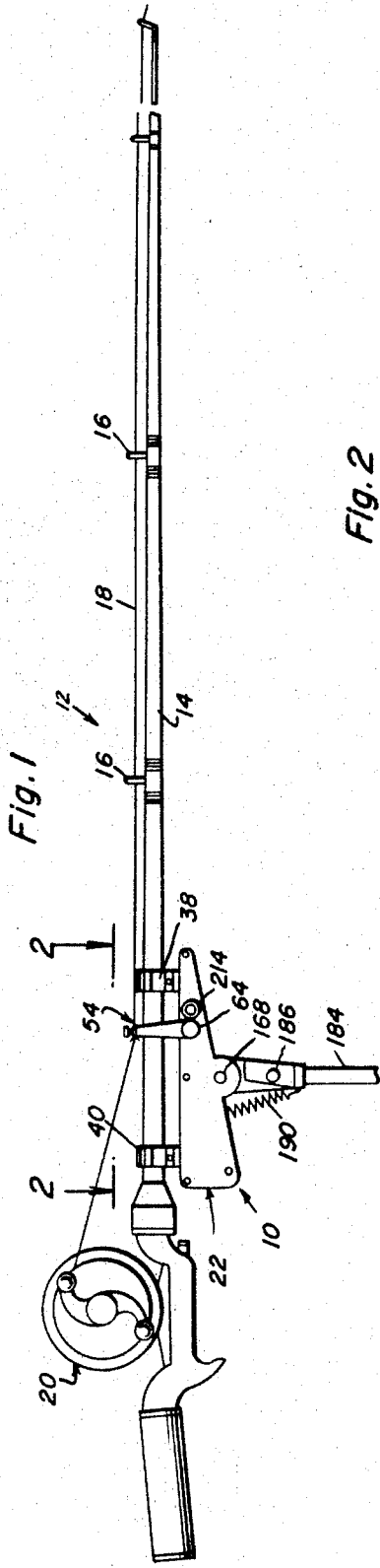
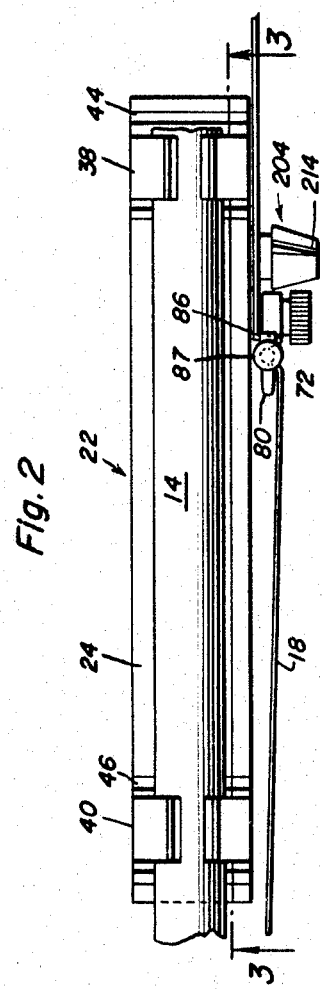
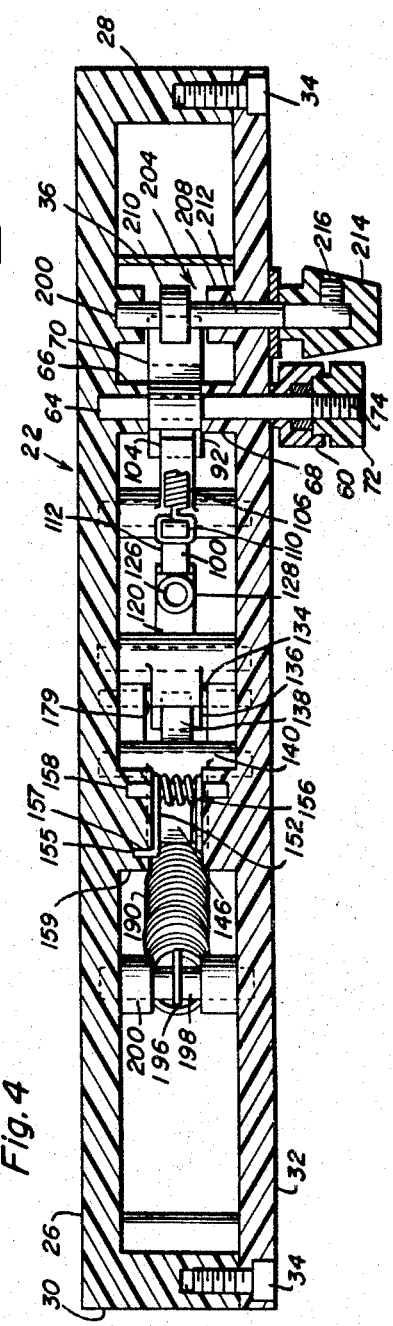
Alfred M. Gibbons
INVENTOR.

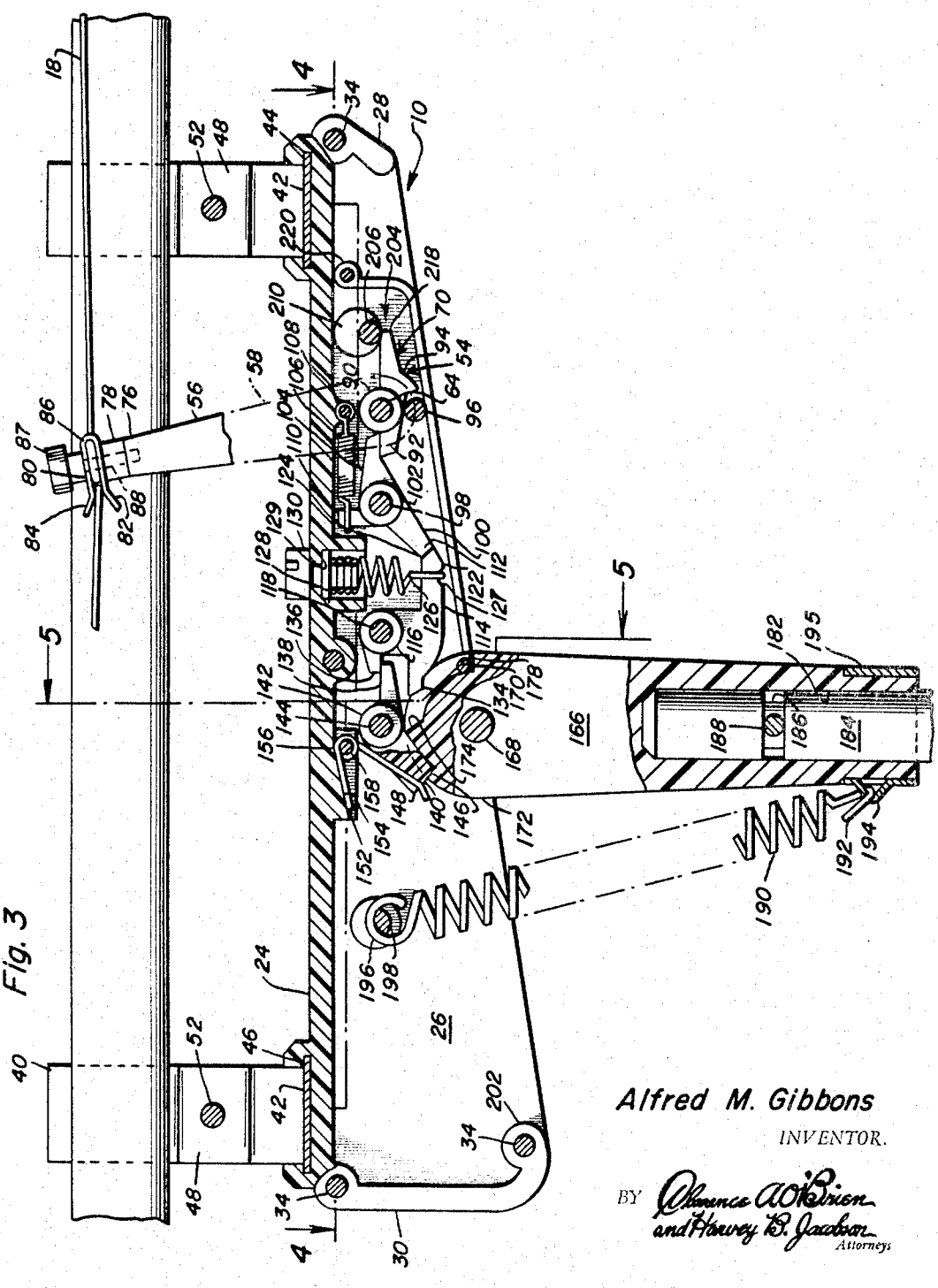

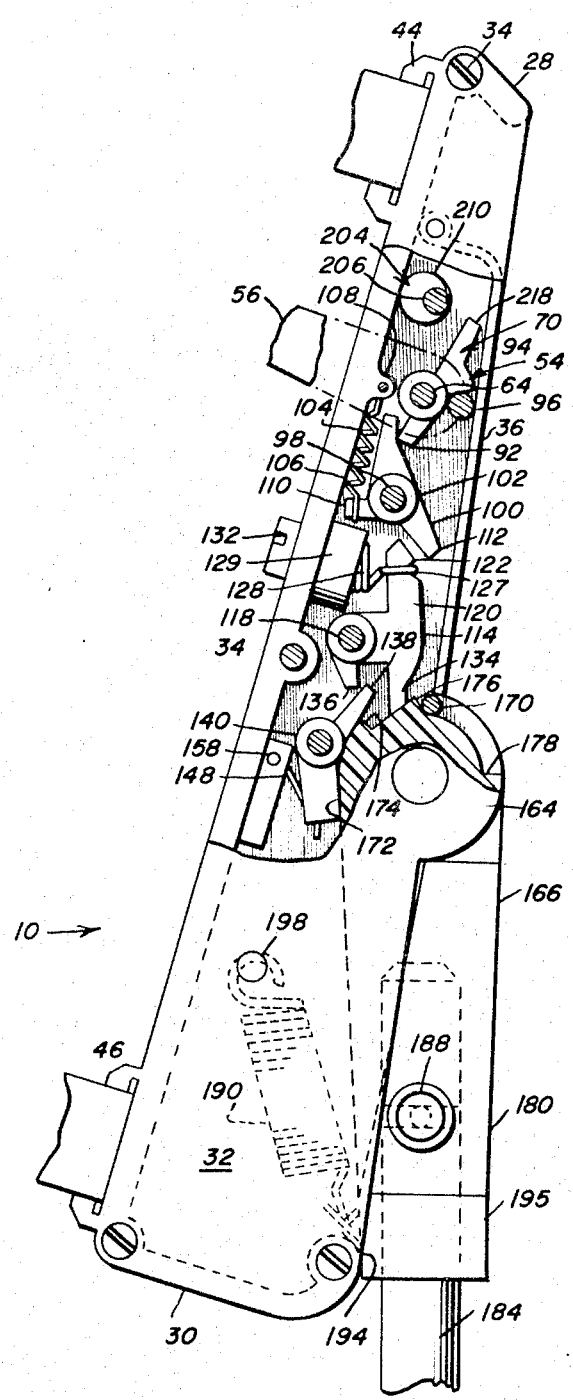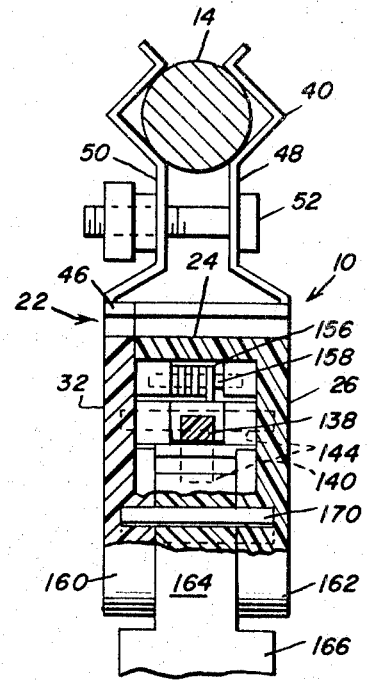

United States Patent Office 3,453,765
Patented July 8, 1969

3,453,765
FISHING ROD SUPPORT
Alfred M. Gibbons, 5511 Pinto Lane,
Amarillo, Tex. 79106
Filed Oct. 27, 1966, Ser. No. 589,869
Int. Cl. A01k 97/10, 97/12
U.S. Cl. 43—15            9 Claims

ABSTRACT OF THE DISCLOSURE

An upstanding support member having a housing pivotally attached to the upper end thereof and spring-biased in one direction with the housing supporting a fishing rod and reel thereon. The housing includes a trigger mechanism operated by movement of the fishing line to release a latch assembly to enable the spring-biased housing to move to elevate the end of the fishing rod remote from the reel in response to a pull on the line caused by a fish taking a hook thereon.

---

This invention generally appertains to improvements in fishing devices and more particularly relates to a novel and useful fishing rod support which is adapted to hold a rod, in structural association with a sand spike, dock mount, boat clamp or the like, in such a manner so that the rod is disposed normally in a substantially horizontal position and is swung, with a quick, snap-like action, into a raised position in response to the action of a fish taking the hook on the line carried by the rod in order to set the hook in the mouth of the fish.

Fishing rod holders which support a rod for pivotal movement about a horizontal axis and which are provided with a resilient means for swinging the rod about such horizontal axis into an elevated position, wherein the outer end of the rod is substantially elevated so that the hook on the end of the fishing line is set in the mouth of the nibbling fish, are known. Such holders are attached to a rod and are intended to respond directly to a tug or pull by a fish on the line but most usually the outer end of the fishing rod is elevated by a jerking movement of the fishing line acting on the outer end of the rod which when pulled downwardly sets the holder in elevating movement.

Such fishing rod holders, however, do not have reliable hook-setting capacities, by virtue of their particular mechanical construction and slow reaction when the fish tugs or pulls on a baited hook. Furthermore, such fishing rod holders, whether responding to downward movement of the outer end of a rod or to a direct pull on the line, are large and bulky and are unduly mechanically complicated and are heavy and obstructive in the use of a fishing rod. In addition, such fishing rod holders are limited in their usability because they are not capable of being adjusted to compensate for climatic conditions and for different species or weights of fish and water or fishing conditions, for example, whether still or casting fishing.

Accordingly, an important object of the present invention is to provide a novel fishing rod support which possesses an almost perfect hook-setting ability by a simple and extremely reliable mechanical action, when a fish pulls or tugs on a hook on a line carried by a rod supported or attached to the fishing rod support.

Another important object of the present invention is to provide a fishing rod support which is extremely compact and lightweight and which is adapted to be in integral association with a fishing rod so that the fishing rod can be utilized and handled in its normal fashion and then the support, which is set in a position of potential operation, can be used to reliably dispose and mount the rod in a supported position.

Another important object of the present invention is to provide a fishing rod support for supporting a rod so that the hook is automatically set in the mouth of a fish when a fish pulls on a line carried by a rod which is attached to and supported by such fishing rod support, such support being automatic in performing its hook-setting function responsive to hook-setting pressure on the line and adjustable so as to govern the amount or degree of initial pull on the fishing line which sets the device into automatic operation quicker than a fisherman could manually jerk up the outer end of the rod and also to provide adjustment means to govern the amount or degree of hook-setting force, that is, jerk by the fishing rod, and adjustment means which compensates for varying wind and water surface conditions.

Another important object of the present invention is to provide a novel device of this type which is extremely small, lightweight and compact, which is formed in a precision fashion and is extremely durable so that it will function in a trouble-free manner for an extremely long period of time and which can be inexpensively manufactured, purchased and utilized.

A meritorious feature of the present invention resides in the provision of a rod holder which is attachable in a subjacent axially aligned position on a fishing rod provided with a reel and line and having a member rotatably associated with and depending therefrom and adapted to be attached to a boat, dock or launch surface supporting means with resilient means interconnected between the rod holder and the member for urging the rod holder from a fishing position substantially normal to the member, that is, with the rod in a substantially horizontal position and the line extending out therefrom with the baited hook submerged in the water, into a position lying substantially along side vertically orientated member with the outer end of the rod tilted upwardly, latch means for releasably locking the rod holder in the fishing position, a trigger means for releasing the latch means and including a trigger arm having means for releasably connecting the line thereto so that the trigger means responds to a pull of a fish on the baited hook on the line in permitting the spring means to swing the rod holder upwardly and raise the outer end to set the hook in the mouth of a fish.

Another meritorious feature of the present invention resides in the provision of means whereby the fishing line can be adjustably attached to the trigger arm thereby providing an adjustment of the line holding tension and to provide means for adjusting the tension of the trigger means whereby the amount and degree of forward pull on the fishing line required to actuate the trigger means and release the latch means is controllable which takes into consideration different species and weights of fish and diffrent fishing conditions.

A further meritorious feature of the present invention resides in the provision of means for utilizing the resilient means interconnecting the rod holder and the member for playing the fish and to prevent the fish from relatching the latch means and to provide a novel structural means whereby the member can be utilized as a cocking arm for cocking the mechanism, that is, for repositioning the latch means and disposing the rod holder in a potential operating position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a fishing rod support, constructed in accordance with the present invention, and showing the same in operative association with a fishing rod assembly which is shown in use;

FIGURE 2 is a fragmentary top plan view on an enlarged scale, taken on line 2—2 of FIGURE 1;

FIGURE 3 is a longitudinal vertical sectional view, taken substantially on line 3—3 of FIGURE 2 and illustrating the operating mechanism and showing the device in a cocked fishing position;

FIGURE 4 is a longitudinal, cross-sectional view, taken substantially on line 4—4 of FIGURE 3;

FIGURE 5 is a vertical cross-sectional view taken substantially on line 5—5 of FIGURE 3; and FIGURE 6 is a sectional view, similar to FIGURE 3 but showing the support in an uncocked position with the fishing rod in a raised or elevated position, which it would assume after the mechanism has been actuated and rendered operative in response to a tug or pull by a fish on the hook end of the fishing line of the fishing rod assembly.

Referring now more particularly to the accompanying drawings, the fishing rod support or device of the present invention, generally designated by the numeral 10, is adapted to support or to be attached to any conventional rod and reel assembly, such as that generally designated by the reference numeral 12. The fishing rod assembly 12 includes a rod 14 having guide eyes 16 through which a line 18 extends from a reel 20 mounted on the handle end of the rod. The rod can be of any type, such as a surfing rod, a trolling rod, or any other light-tackle type rod.

This fishing rod support or device 10 of the present invention includes a housing 22, which, as shown, is preferably molded from a commercial high impact transparent plastic and is formed in two pieces. However, the type of material and the specific housing construction may vary and the housing 22 is merely exemplary. The housing 22 comprises a flat, elongated and narrow top wall 24, which is formed integral with a side wall 26 and opposing end walls 28 and 30. A side wall 32 is provided and disposed parallel to the side wall 26 and fastened to the end walls 28 and 30 by suitable screw fasteners 34. Of course, as before stated, the housing may be made in other ways, for example, in two identical half-sections which could be detachably fixed together by transverse screw rod assemblies or the like. In any event, the housing is composed of the flat top wall 24 and the opposing straight side walls 26 and 32 and the rear end wall 30 with the housing being somewhat triangular in side elevation and having a relatively short front wall 28. The bottom of the housing is open, except for the provision of a shield member 36, which will be more particularly described hereinafter.

The housing is adapted to be disposed subjacent the rod 14 and is of a width so that it is not substantially greater in width than the diameter of the inner end of the rod 14 which is mounted thereon. The housing 22 is attached to the rod 14 by means of forward and rearward identical spring-steel mounting clamps 38 and 40. The mounting clamps are channel-shaped and have bases 42 which are securely held in position on the top wall 24 by transverse channels 44 and 46 molded on the top wall. The clamps have complemental clamping arms 48 and 50 with the outer end portions thereof being outwardly bowed so as to receive rods of various diameters with the rods, as, for example, the rod 14, being held fixed against axial movement between the clamping arms 48 and 50 of the forward and rearward clamps 38 and 40 by releasable and adjustable bolt assemblies 52, which securely hold together the inner portions of the arms so as to clamp the outer portions of the arms tightly on the rod 14. The mounting clamp bases snap fit into the molded channels and are securely held therein by tension resulting from tightening of the bolt assemblies 52 which hold the outer ends of the clamping arms securely on the rod 14.

If desired, the fishing rod 14 may be wrapped with any suitable adhesive tape at the location engaged by the clamping arms of the forward and rearward clamps 38 and 40 or the inner surfaces of the outer clamping portions of the arms may be covered with resilient material or plastic so as to prevent any possible marring of the exterior surface of the rod.

The housing 22 may be positioned in integral association with the rod 14 at any desired location so that the housing is disposed subjacent the rod and supports the rod with the rod and housing being in axial alignment. The preferred position of the device 10 on the rod is at the rear or handle end of the rod stem, immediately in front of and approximately perpendicular to the rod handle. In such a position, the device 10 does not interfere with the normal handling and use of the rod 14.

Means is provided for attaching the fishing line 18 to the device 10 so that the pull or tug on the outer hook end of the line 18 will actuate the trigger mechanism or means 54 when the hook is taken by a fish. In this respect, the trigger mechanism 54 includes a trigger arm 56, which is molded from high impact commercial plastic, and which is disposed alongside and exteriorly of the side wall 32 and extends upwardly therefrom. The lower end portion 58 of the arm is formed with a non-circular transverse aperture 60, fitted on the square portion 62 of a trigger assembly shaft 64. The shaft 64 is rotatably disposed transversely between the side walls 26 and 32 and is journalled in inwardly extending bosses 66 and 68 formed on the inner surfaces of the side walls and spaced apart at their inner ends so as to permit the trigger member 70 to be fixedly mounted on the shaft, as will be described.

The lower end portion 58 of the trigger arm 56 is held in place by a finger manipulable nut 72 threaded on the exteriorly threaded end portion 74 of the shaft 64. Thus, swinging movement of the trigger arm 56 will cause corresponding rotative movement of the shaft 64 and actuate the trigger member 70, as will be described.

The outer end 76 of the trigger arm is encompassed by a channel-like mounting member 78 for a line holder clasp 80. The line holder clasp 80 includes a U-shaped member having a pair of inherently resilient clasping arms 82 and 84, with outer divergent free ends and connected by a web portion 86. The member 80 is attached by the channel-like member 78 onto the outer distal end of the end portion 76 of the trigger arm by a screw 87 which extends axially into an axial threaded bore 88 in the outer end portion 76 of the trigger arm 56. The fishing line 18 is entered between and into the open ends or lips of the two arms 82 and 84 of the clasp 80 and is pulled forwardly around the bight portion of the clasp and is securely held in position to the rear of the inside of the shank portion or shaft of the adjustment screw 87, as shown in FIGURES 2 and 3. Adjustment of the line holding tension is provided by the adjustment screw 87 mounted above and through the line holder clasp and threaded into the bore 88 in the outer end portion 76 of the trigger arm. Desirable line-holding tension for any given strength fishing line is that degree at which a forward pull on the fishing line will withdraw from the line holder clasp just before the fishing line might break and the tension can be adjusted by adjusting the screw 87. As will be pointed out, once the device 10 has served its function, further pull on the line will release it from the clasp and permit the fisherman to play the fish by actuating the reel 20 in normal fashion.

The trigger means 54 is thus composed of the trigger arm 56, which is attached by the clasp means 80 to line 18 and the trigger member or element 70 which is fixed on the shaft 64 to which the trigger arm 56 is also fixed so that the trigger arm 56 rotates the shaft 64 to actuate the trigger element 70.

As shown more particularly in FIGURES 3 through 6, the trigger element 70 includes a mounting hub portion 90 fixedly circumposed on the trigger assembly shaft 68 and having a rearwardly projecting trigger dog 92 and having a stop portion 94, which in the actuating clockwise movement of the trigger element is adapted to abut a transverse stop pin 96 extending between the side walls of the housing.

Mounted for rotation on transverse pin 98 immediately rearwardly of the dog 92 is a trigger latch 100. The pin 98 extends transversely between the side walls and has a hub portion 102 of the latch member 100 rotatably mounted thereon. The latch member has a forwardly extending tail 104, which is adapted to overlie the dog 92 and which is held by a light retainer spring 106, which has its forward end attached to a pin 108 and its rearward end attached to an upstanding lug portion 110 on the latch member. The latch member has a rearwardly projecting tail portion 112, which is adapted to cooperate with a hammer 114. The hammer 114 has a hub portion 116 which is rotatably mounted on a pin 118 that extends transversely between the side walls of the housing and the hammer has a forwardly projecting tongue portion 120, which terminates in a beveled front end face 122 that is adapted to abut the rearward face 124 of the rearwardly projecting tail portion 100 of the latch member. The tongue portion 120 is attached to the outer loosely coiled end portion 126 of a combination extension and compression spring 128. The spring 128 has its lower end anchored around a suitable groove 127 formed in the tongue portion 120 of the hammer 114 and the spring is disposed in a boss-like spring housing 129 depending integrally from the top wall 24 and has its upper end structurally attached to an adjustment screw 130 with the kerf provided outer end 132 of the screw being disposed exteriorly of the top wall so that the spring, which holds the hammer can be adjusted to compensate for variations in the weight of different fishing rods and reels being used, as will be described in the operation of the mechanism.

The hammer member 114 is formed with rearwardly projecting and vertically spaced lips or shoulders 134 and 136 which are adapted to cooperate with the forwardly extending tail portion 138 of a cocking latch or latch member 140. The member 140 has a hub portion 142 which is rotatably mounted on a transverse pin 144. The latch member is also formed with a rearward retainer portion or tooth 146 against which one leaf 148 of a coil spring 150 is adapted to bear, the opposing leaf 152 bearing against a beveled shoulder 154 formed on the inner surface of the top wall and the spring coil 156 being fixed on a pin 158 extending between the side walls of the housing and having a laterally offset end 155 on the leaf 152 socketed in a bore 157 in the inward projection 159 on the side wall 26.

The side walls 26 and 32 of the housing are provided, intermediate the front and rear walls 28 and 30 with opposing ears 160 and 162, which rotatably receive therebetween the rounded upper or inner integral end portion 164 of a cocking arm or member 166, which functions as a cocking arm and which also functions as a supporting arm, as will be described. The end portion 164 has opposing flat sides rotatably fitted between the flat inner sides of the ears and the end portion is rotatably connected thereto by a shank portion 168 of a bolt assembly, the shank portion 168 defining a pivot pin for the swinging of the member 166 relative to the housing and for the swinging of the housing relative to the member 166, when the latter is in its supporting function, as shown in FIGURE 1, for example. A stop pin 170 is transversely disposed between the side walls in front of the ears. The inner end portion 164 of the member 166 is provided with a free semi-curved periphery 172 having a peripheral shoulder 174, which is adapted to cooperate with the retainer end portion 146 of the latch member 140 and also provided with a peripheral shoulder 176 which is spaced circumferentially in a clockwise direction from the shoulder 172 and is adapted to cooperate with the hammer in the cocking of the latching mechanism and resetting of the trigger mechanism, as will be described. A further shoulder 178 cooperates with the stop pin 170 in the cocking, as will be described and as shown in FIGURE 3.

The member 166 is formed with a lower end portion 180, which has an axial bore 182 to receive a supporting sand spike 184, for example, or to receive any fixed rod element on a boat or on a dock. Such support element 184 is formed with a peripheral groove 186 and the lower portion 180 of the member 166 is provided with a radial setscrew 188 to fit in such groove and to lock the member on the support element 184 against axial accidental upward withdrawal movement but free for rotative or swivel movements. The support element also can be locked against any rotative movement, if desired, by further tightening of such radial setscrew.

A spring 190 is provided with a lower hook end 192 which is anchored to a hook or eyelet 194 formed on an annular band 195 which is fixedly circumposed on the lower or outer end of the end portion 180. The upper hook end 196 of the spring is hooked around a pin 198, which extends transversely between the side walls of the housing 22 and which is provided with round end enlargements 200 so as to centrally locate the hook end 196, as shown in FIGURE 4. In this respect, the portion 198 is somewhat flattened and extremely reduced in cross-sectional size to the size of the enlargements 200 so that the hook 196 can be easily unhooked therefrom, after the lower hook end 192 is removed from the eyelet 194 for the purpose of substituting a spring of different tension, as will be described.

The lower end portion 202 of the rear wall 30 is adapted to abut the band 195, as shown in FIGURE 6, and such end constitutes a shock pad, which may be padded or otherwise provided, since it receives the impact of the housing, when the housing is swung about the pivot 168 by the action of the potential retraction spring 190, the action of which is prevented by the latching mechanism, until the trigger mechanism is actuated by a tug or pull on the line 18 as will be described.

In the use of the support or holder 10, the same is attached subjacent axially aligned position to the rod 14 by means of the clamps 38 and 40.

The device 10 is moved into a cocked position, as shown in FIGURE 3, from the uncocked or unlatched position of FIGURE 6, by pulling downward and forward on the cocking arm or support element 166 in the direction of the arrow, as shown in FIGURE 6. This movement rotates the integral end portion 164 on the upper end of the cocking arm 166 counterclockwise which causes the shoulder 176 to lift upwardly on the lip or shoulder 134 of the hammer member 114 and simultaneously causes the hammer member to rotate clockwise and pull the tongue portion 120 downwardly and correspondingly extend the hammer spring 128. At a point approximately half-way through the entire possible movement of the cocking arm 166, the integrally molded tongue portion 120 of the hammer 114 is lowered to a point where the tail portion 112 of the trigger latch member is pulled forwardly by the attached retainer spring 106 and into position over and above the tongue portion 120 of the latch member. At a point of continued rotation of the cocking arm or supporting element 166 just beyond that described above, the shoulder 176 clears the lip 134 of the hammer and permits the hammer spring 128 to pull upward on the tongue portion 120 and hold it tightly in contact with the tail portion 100 of the latch member, with the faces 122 and 124 of the tongue portion 120 and the tail portion 100 in firm locked contact. At this point, the triggering mechanism or means 54 is in cocked position.

To put the device 10 into full cocked position, the forward movement of the cocking arm or supporting element 166, in the direction of the arrow in FIGURE 6, is continued until it stops in a position perpendicular to the housing, at which time the shoulder 178 comes to rest against the stop pin 170 and at which time the tooth 146 is forced by the spring 150 into engagement with the shoulder 174.

Should the user, in the cocking of the device 10, allow the cocking arm 166 to slip during its cocking movement, whether the trigger means or mechanism has been set or cocked or not, the spring 190 will pull the cocking arm backwardly causing the shock pad 202 to engage the band 195. However, no damage will result in any part and the procedure is merely repeated.

With the device 10 in the full cocked position as shown in FIGURE 3, it is placed over and onto the top end of the anchoring support or device 184 and rests thereon in a horizontal position, supporting the attached fishing rod 14 in a position approximately parallel to the ground or water level. As aforestated, the radial setscrew 188 is utilized to prevent the cocking arm or supporting element 166 from being accidentally lifted off the supporting element 184 while permitting the device and attached rod to freely swivel or rotate. However, the device and rod can be locked with the fishing rod pointed in any desired direction by tightly tightening the setscrew 188.

The fishing line 18 is entered between and into the two lips of the line holding clasp and is pulled forward to securely engage in the clasp. The adjustment of the line holding tension is provided by the use of the adjustment screw 87 mounted above and through the line holder clasp and threaded into the top or outer end of the trigger arm 56. The device is now ready for use. With respect to the attachment of the line, desirable line-holding tension for any given strength fishing line is that degree at which a forward pull on the fishing line will withdraw it from the line holder clasp 80 just before one might suspect that the fishing line would break.

With respect to FIGURE 3, the device is shown in condition for use with the baited hook (not shown) on the outer end of line 18 submerged in the water. When a fish takes the baited hook into its mouth and pulls on the fishing line 18, a forward movement of the trigger arm 56 results. This movement rotates the trigger shaft 64 in a clockwise direction. The integrally molded dog 92 on the rotatable trigger hub portion 90 is rotated in a clockwise direction and lifts the tail portion 104 of the latch member in a counterclockwise direction which disengages it from and in contact with the tongue portion 120 of the hammer 114. The extended hammer spring 128 then pulls upwardly and rotates the hammer 114 in a counterclockwise direction thus rotating the upper lip or shoulder 136 downwardly against the tail 138 of the latch member. This forces the molded tooth 146 of the cocking latch or latch member upwardly in a clockwise direction and, thus, disengages it from the shoulder 174 on the inner end of the support element or cocking arm 166. The potential in the retraction spring 190 is now put into action and the spring is free to retract and draw the housing downwardly and upwardly about the axis 168 with the attached rod being pulled upwardly and rearwardly. This causes an immediate and substantial jerk on the outer end of the fishing rod and on the fishing line and causes the hook to be firmly and quickly set in the fish's mouth.

In addition to the hook-setting action, the movement of the device signals its user that a strike has occurred.

If the user does not immediately notice the raised or tilted condition of the rod, the device 10 tends to ensnare and "play" fish in an almost human-like manner. Once the device is triggered and released, as shown in FIGURE 6, it will not recock no matter what the amount of pull may be by the fish. This feature of the device requires the fish to fight against the tension of the spring 190 which resists the fish in direct opposition to the fish's energy, thereby preventing a large fish from making a hard sharp pull that might otherwise break a fine line or leader.

Upon observing the condition of the device 10, as shown in FIGURE 6, or observing the action described above, the user of the device simply loosens the setscrew 188, if tightened, and lifts the fishing rod with the device 10 attached from the supporting stake or rod 184 and utilizes the rod in its normal fashion. The first turn on the reel handle withdraws the fishing line from the line holder clasp and the user then reels in the fish in the customary manner.

It is important to note, that in the trigger and releasing action, the molded lip 134 of the hammer, which is the cocking lip, is pulled downward by the extended hammer spring 128, thus positoning the lip of the hammer in front of the cocking shoulder 176 as on top of the cocking arm or element 166 as it rotates counterclockwise by pull from the retraction spring 190. At one time or another but always after the device has been triggered and released, the lower end of the cocking arm will come to rest against the molded shock pad 202 located at the lower rear of the housing of the device. Such action always causes a repositioning of the molded lip 134 of the hammer 114 at a point above the cocking shoulder 176 on top of the cocking arm or element 166, thereby readying the device 10 for recocking. In the course of such action, the molded lip 134 of the hammer and the cocking shoulder 176 on top of the cocking arm 166 both slightly deform under load and subsequently reshape to original dimensions. Therefore, it is desirable that all of the elements be molded of a high-impact plastic, such as commercially available plastics known as nylon or Delrin, since such material will deform under load and reshape to original dimensions almost indefinitely, thereby affording long life of the entire device.

The amount or degree of forward pull on the fishing line required to trigger and release the device 10 is controllable by means of a trigger tension adjustment assembly 204, which comprises a shaft 206 rotatably journalled in internal bosses 208 formed on the opposing sides of the housing and having an integral eccentric 210 formed centrally thereon and located between the bosses. The shaft 206 extends through a suitable opening 212 in the side wall 32 and has a finger knob 214 fixed by a radial screw 216 on its outer projecting end. The eccentric 210 overlies the flat upper surface of a forwardly projecting adjustment lip 218 on the hub of the trigger member. Full range of tension adjustment, from lightest to heaviest, is equal to one-half revolution of the eccentric cam bearing on the upper face of the lip 218 of the trigger element. When the eccentric cam is positioned highest above the shaft 206, as shown in FIGURE 3, it places the trigger latch 100 for the largest amount of overlap in contact with the inner contacting portions of the trigger latch and hammer when in cocked position, thereby requiring the hardest and longest pull on the trigger arm 56 to trigger and release, such pull being by a fish nibbling on the hook on the line 18. When the eccentric cam 210 is rotated clockwise and downward below the shaft 206, it positions the trigger latch with the least amount of overlap in contact with the adjoining portion of the hammer when in cocked position, thereby requiring the lightest and shortest pull on the trigger arm 56 to trigger and release. Various positions within the full range of adjustment may be made and provides various degrees of trigger tension.

It is proposed to utilize springs 190 of different tension, such as a medium-tension spring for use with small "pan size" fish and a heavy-tension spring for use with larger fish, which give a greater and harder jerk on the line, requiring a harder jerk on the fishing line and greater tension to resist the fight of the largest fish.

The spring 190 is changed by removing the mounting screw 168 on the housing and disengaging the arm or element 166 from the housing with a downward and backward pull. A slight counterclockwise turn of the cocking arm or element 166 will disengage the spring 190 from the clip or eyelet 194 in the band 195. An upward push on the spring 190 will then disengage it from the holder 198 inside the housing and the spring can be entirely removed from the device and an alternate spring installed in a manner exactly opposite to that described for removal.

The hammer spring holder adjustment screw 130 can be used to compensate for variations in the weight of different fishing rods and reels being used, a factor having to do with leverage variations that determine a degree of force required to disengage the tooth of the cocking latch from the shoulder on the inner end of the cocking arm or supporting element 166.

The shield member 36, which is in the nature of a thin plastic plate, is curved upwardly at its front end and hinged by a transverse pin 220 at such end between the side walls of the housing. The shield plate is of a width to fit between the side walls and has a free rear end 222 which extends back to the pivoted inner end portion of the cocking arm or supporting element 166 which tends to hold it in closure position, as shown in FIGURE 3. In such position, it serves as a bottom wall to protectively underlie the operating components of the trigger, hammer and latch mechanisms.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fishing rod holder comprising a housing having means for attachment to a fishing rod with a line so that the housing is disposed in a subjacent axially aligned position with the rod, a support member adapted to be rearwardly mounted in a substantially perpendicular position, means pivotally mounting said housing on the support member for movement of the housing about a substantially horizontal axis, said housing being positionable substantially normal to the mounted position of the support member to support a rod in a substantially horizontal position, resilient means connected between said housing and the support member for urging the housing and attached rod into a substantially vertical position, latch means in the housing operatively connected between the housing and the support member for retaining the housing substantially normal to the support member with said resilient means biased, and a trigger mechanism in said housing and adapted to be connected to the line and operative to disengage said latch means responsive to a pull on the line caused by a fish taking a hook on the line, said support member including an integral upper end portion, said means pivotally mounting the housing on the support member including a pivot means attaching the integral upper end portion to the housing intermediate the ends of the housing, said latch means including a spring urged latch element pivotally mounted in the housing adjacent the pivot axis, said integral upper end portion and latch element having cooperative engaging means, said trigger mechanism including a trigger element pivotally mounted in the housing and means in said housing operatively associating said trigger element with the latch element, a trigger arm upstanding from the housing and actuatably connected with the trigger element and means carried by the trigger arm for attaching the line thereto, and adjustable means operatively mounted in the housing and operatively associated with the trigger element to adjust the initial position of the trigger element for selective response to varying tension on the line.

2. The invention of claim 1, wherein said housing has a rear end and a forward end, said resilient means being removably connected between the rear end and the support member.

3. The invention of claim 2, wherein said rear end of the housing defines a stop means adapted to abut the support member under the action of the resilient means.

4. The invention of claim 3, wherein said support member has means for mounting it on a supporting means against axial movement and for selective free swiveling movement about its axis.

5. A fishing rod holder comprising a housing having means for attachment to a fishing rod in a subjacent axially aligned position with the rod having a fishing line, a support member adapted to be removably mounted in a substantially perpendicular position, said support member having an integral end portion, means pivotally mounting said housing on the integral end portion, said housing having a rearward and forward portion extending from the pivotal point with the support member, said housing being positionable normal to the support member to support a rod in a substantially horizontal position, resilient means connected between the rearward portion of the housing and the support member for urging said housing and attached rod into a tilted substantially vertical position with the housing moving about the pivot means constituting a horizontal axis, latching means adjacent the axis and operatively mounted in the housing for preventing operation of said resilient means, a trigger mechanism operative to disengage the latching means, means for connecting the line to the trigger mechanism so as to actuate the same responsive to the pull of a fish on a hook on the line, said latching means and the integral end portion of the support member having interengaging cooperative means for releasably holding said housing in said horizontal position, means in said housing interconnecting the latching means and the trigger mechanism, and adjustable means operatively associated with said trigger mechanism for adjusting the initial position thereof.

6. The structure as defined in claim 1 wherein said means operatively associating said trigger element with the latch element includes a trigger latch pivotally supported in said housing and including a forwardly extending portion engaged with the trigger element and a rearwardly extending tail portion, a hammer pivotally mounted in the housing and including a forwardly extending tongue portion engageable with the rearwardly extending tail portion of the trigger latch and rearwardly extending lips disposed in spaced relation, said latch element including a forwardly extending tail portion received between the lips on the hammer whereby the latching element is captively associated with the hammer, said latch element being spring-biased to a latching position for cocking the hammer and orienting the forward end of the tongue portion thereof in cocking engagement with the tail portion of the trigger latch to set the trigger mechanism automatically when the housing is moved to a substantially horizontal position.

7. The structure as defined in claim 6 wherein said forwardly extending tongue portion of the hammer is provided with a spring connected thereto and adjustably connected to the housing and associated with the tongue portion to vary the force required to move the hammer to cocked position.

8. The structure as defined in claim 7 wherein the forward end of the tongue portion of the hammer and the rearward end of the rearwardly extending tail portion of the trigger latch are provided with inclined abutment surfaces engaged with each other when in cocked position with the tail portion of the trigger latch being moved downwardly upon actuation of the trigger arm and trigger element, spring means interconnecting the trigger latch and housing to bias the trigger latch to a cocked position with the upper surface of the tail portion engaging the surface of the tongue portion of the hammer and preventing engagement of the abutment surfaces until the latch element has returned to latching position thus pivoting the hammer to cocked position to return the abutment surface of the tongue portion of the hammer into engagement with the abutment surface on the rearwardly extending tail portion of the trigger latch.

9. The structure as defined in claim 5 wherein said means interconnecting the latching means and the trigger mechanism includes an abutting surface on a pair of pivotal elements constituting a portion of the trigger mechanism and latching means with one of the surfaces being biased away from engagement with the abutting surface on the other pivotal member and being returned to a cocked position in alignment with and in engagement with the abutment surface on the other pivotal member when the latching means is returned to latched engagement with the support member thereby setting the fishing rod holder in a cocked condition.

References Cited

UNITED STATES PATENTS

| | | | |
|---|---|---|---|
| 2,184,583 | 12/1939 | Danko | 43—21.2 |
| 2,703,465 | 3/1955 | Stefano | 43—15 |
| 2,744,351 | 5/1956 | Smith | 43—16 |
| 2,770,906 | 11/1956 | Hood | 43—16 |
| 2,804,277 | 8/1957 | Kinder | 43—16 X |
| 2,996,824 | 8/1961 | Faycosh | 43—16 |
| 3,055,136 | 9/1962 | Scott et al. | 43—15 |

WARNER H. CAMP, *Primary Examiner.*

U.S. Cl. X.R.

43—21.2